United States Patent [19]
Saulnier et al.

[11] Patent Number: 6,061,388
[45] Date of Patent: May 9, 2000

[54] SPREAD SPECTRUM COMMUNICATION SYSTEM WITH FREQUENCY-SEPARATED MESSAGE AND REFERENCE SIGNALS

[75] Inventors: Gary Jude Saulnier, Rexford; Eugene Joseph Orlowski, Jr., Scotia; John Anderson Fergus Ross, Schenectady, all of N.Y.

[73] Assignee: General Electric Company, Schenectady, N.Y.

[21] Appl. No.: 08/660,382

[22] Filed: Jun. 7, 1996

[51] Int. Cl.[7] .............................. H04B 15/00; H04K 1/00; H04L 27/30

[52] U.S. Cl. .............................................. 375/200

[58] Field of Search ................................ 375/200, 206, 375/208, 269, 272, 283, 285, 295, 296, 303, 316, 334, 346, 347, 254; 332/100, 123; 330/300, 315

[56] References Cited

U.S. PATENT DOCUMENTS

| | | |
|---|---|---|
| 4,112,372 | 9/1978 | Holmes et al. . |
| 4,122,393 | 10/1978 | Gordy et al. . |
| 4,475,219 | 10/1984 | Puckette .................... 375/82 |
| 4,494,238 | 1/1985 | Groth, Jr. ................ 375/200 |
| 4,583,231 | 4/1986 | Puckette ..................... 375/1 |
| 4,607,375 | 8/1986 | Lee . |
| 4,841,527 | 6/1989 | Raychaudhuri et al. ................. 371/32 |
| 4,888,788 | 12/1989 | Teranishi et al .......................... 375/200 |
| 4,972,431 | 11/1990 | Keegan ..................... 375/200 |
| 4,977,578 | 12/1990 | Ishigaki et al. .......................... 375/200 |
| 5,166,953 | 11/1992 | Hershey et al. ............................ 375/1 |
| 5,235,612 | 8/1993 | Stilwell et al. ......................... 370/317 |
| 5,301,206 | 4/1994 | Ishigaki et al. .......................... 375/200 |
| 5,345,245 | 9/1994 | Ishikawa et al. ........................ 342/357 |
| 5,420,593 | 5/1995 | Niles ....................................... 342/357 |
| 5,433,111 | 7/1995 | Hershey et al. .......................... 73/593 |
| 5,465,269 | 11/1995 | Schaffner et al. ....................... 375/200 |
| 5,546,424 | 8/1996 | Miyake .................................. 375/206 |
| 5,675,498 | 10/1997 | White .................................... 364/487 |

*Primary Examiner*—Ricky Ngo
*Assistant Examiner*—Jean B Corrielus
*Attorney, Agent, or Firm*—Marvin Snyder; Douglas E. Stoner

[57] ABSTRACT

A method and apparatus for implementing a spread spectrum communication system of the "transmitted reference" type provides both multipath and interference protection with little complexity. Need for a local reference is avoided by transmitting a reference that the receiver can use to perform despreading. In general, the transmitted reference system sends both a message signal and a reference signal to the receiver. The message signal contains the information to be communicated, which has been spread through multiplication with a wide band "spreading waveform". The reference signal consists of the spreading waveform itself which the receiver call use to despread the message signal and recover the information.

8 Claims, 5 Drawing Sheets

SPREAD SPECTRUM COMMUNICATION SYSTEM WITH FREQUENCY-SEPARATED MESSAGE AND REFERENCE SIGNALS

BACKGROUND OF THE INVENTION

1. Field of the Invention

This invention generally relates to spread spectrum communications systems and, more particularly, to a reliable two-way communications link between mobile units and fixed base facilities.

2. Description of the Prior Art

Spread spectrum communications offer several advantages in communications applications requiring high reliability. These include low density power spectra and interference rejection. In the case of interference rejection, the interference may be accidental, that is, simply part of the environment of the communication system. In a specific application, the communications environment may include many potential reflectors giving rise to severe multipath interference. Such multipath interference typically insinuates deep nulls in the form of frequency selective fading. Spread spectrum communications is an ideal countermeasure to this difficulty.

There are several types of spread spectrum systems including direct sequence digital systems, frequency hopping systems, time hopping systems, pulsed frequency modulated (or chirp) systems, and various hybrids. Of these, the direct sequence digital systems and frequency hopping systems are perhaps the more widely implemented. In a direct sequence digital system, a pseudorandom code generator is used to modulate a frequency modulated carrier. In a frequency hopping system, a coherent local oscillator is made to jump from one frequency to another.

Spread spectrum communications are often asymmetric in cost and complexity. For example, suitable spread spectrum signals may be generated with relatively low complexity circuitry. The challenge is then how to accomplish demodulation of such signals. Usually it is necessary to construct a demodulator which can generate or otherwise process a wideband signal in order to recover the narrowband message. Synchronization is often the most difficult and costly aspect of a spread spectrum communications system.

In order to simplify the receiver in a spread spectrum communications system, it is known to transmit a reference that may be used in place of synchronization and tracking at the receiver; that is, the coded reference is generated and transmitted with the intended information signal. Since the local reference is generated at the transmitter, the receiver need not have a code sequence or other local reference generator.

The invention relates to the direct sequence digital type of spread spectrum communications system using a transmitted reference. A description of this and other types of spread spectrum communications systems may be found, for example, in *Spread Spectrum Systems*, 3rd Ed., by Robert C. Dixon, John Wiley & Sons (1994), and *Spread Spectrum Communications*, Vol. 11, by M. K. Simon et al., Computer Science Press (1985).

In some applications, the communication channel may have severe multipath due to the presence of many reflectors. While spread spectrum systems are tolerant of multipath and provide interference proiection, such systems typically require a complex receiver structure. One reason for the complexity is the need to synchronize a local reference that is used to "despread" the signal. Also, this synchronization process makes it more difficult to provide "burst-mode" communications because the transmitter must wait for the receiver to synchronize its local reference before sending information.

SUMMARY OF THE INVENTION

An object of the invention is to provide a simple and inexpensive method and apparatus for implementing a spread spectrum communication system that provides both multipath and interference protection.

The invention eliminates need for a local reference by transmitting a reference that the receiver can use to perform despreading. The method and apparatus of the invention is in the class of systems known as "transmitted reference" spread spectrum systems. In general, a transmitted reference system sends both a message signal and a reference signal to the receiver. The message signal contains the information to be communicated, which has been spread through multiplication with a wide band "spreading waveform". The reference signal consists of the spreading waveform itself, which the receiver can use to despread the message signal and recover the information.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF PREFERRED EMBODIMENTS OF THE INVENTION

Figure 1:
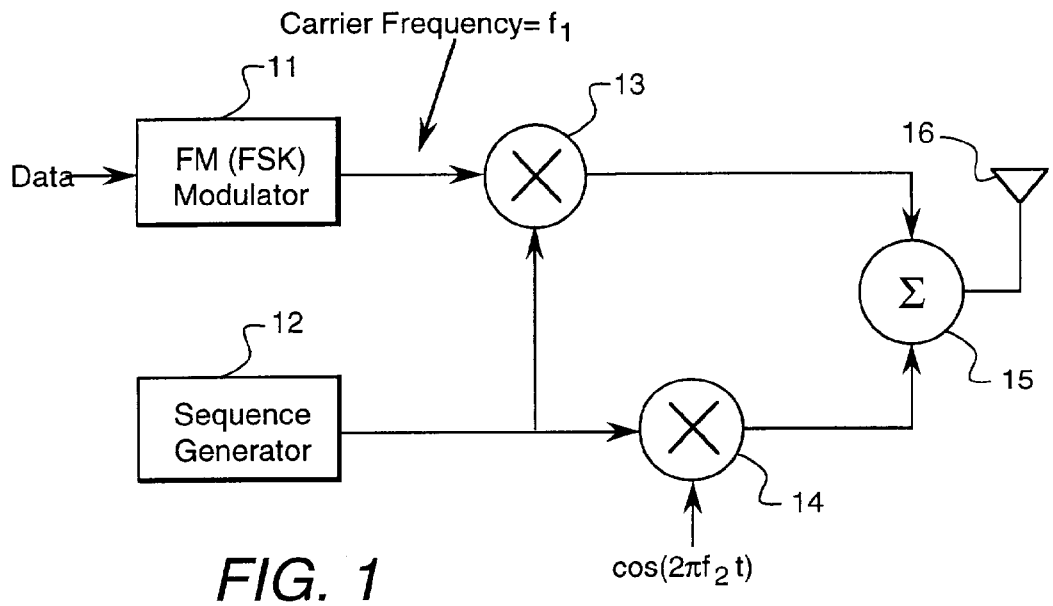
FIG. 1 is a block diagram of a direct sequence spread spectrum transmitter.
Figure 2:
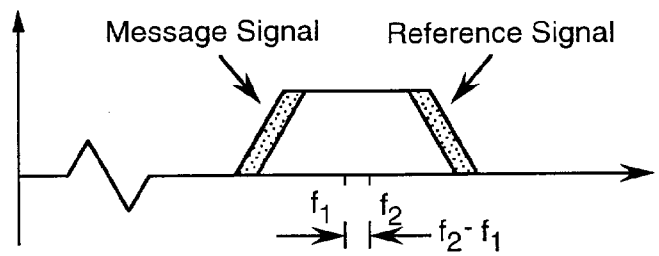
FIG. 2 is a graphical illustration of the frequency spectrum of the transmitter shown in FIG. 1.

FIG. 1 is a block diagram of the transmitter for one embodiment of the transmitted reference system of the invention. In this transmitter, digital data first frequency modulates a carrier in an FM modulator 11 to produce a frequency-shift keyed (FSK) waveform on a carrier of frequency $f_1$. This FSK signal is modulated by the spreading waveform output signal of a sequence generator 12 in a mixer 13, producing a message signal at the carrier frequency $f_1$. Sequence generator 12 produces a high-rate, pseudo-random sequence of +1s and −1s, resulting in a spreading waveform having a much larger bandwidth than the FSK waveform. The rate at which the + and −1s are produced is the "chip rate" of the code. The output of signal sequence generator 12 is also placed on a carrier frequency of $f_2$ in a mixer 14 to create the reference signal which is summed with the spread FSK signal in a summer 15 to produce the transmit signal supplied to an antenna 16. The spectra of the message signal and reference signal waveforms can overlap, as shown in FIG. 2, or may be separated in frequency.

To retrieve the information, a receiver must operate to recover the message and reference signals from the channel. In the system according to the invention, the two signals are separated in frequency; i,e., the reference signal is sent with a different carrier frequency than the message signal. Now, the receiver must ascertain the difference between the two carrier frequencies in order to be able to recover the message. Multiple messages can be sent by sending the message signals at different carrier frequency offsets from the reference signal. A receiver can "tune" to any of the messages by setting the receiver to demodulate the message at the desired carrier frequency offset.

Figure 3:
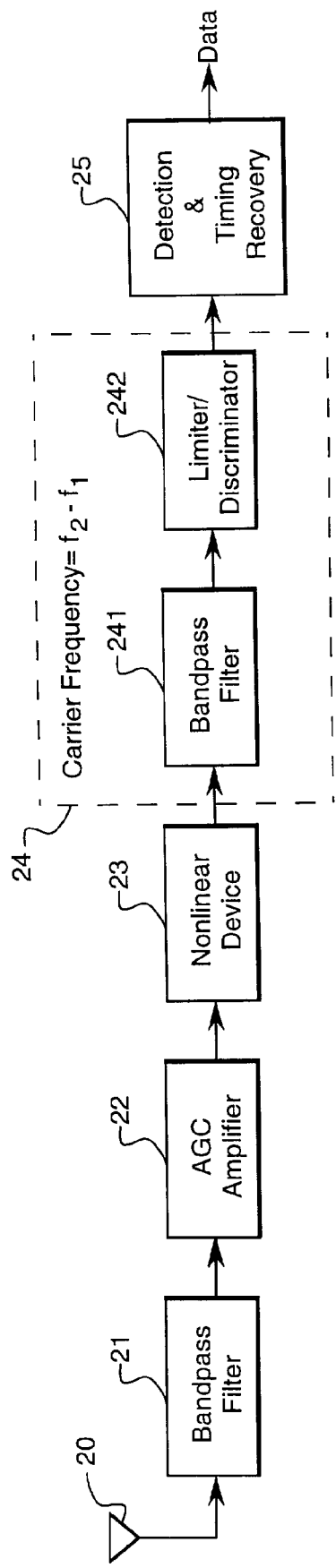
FIG. 3 is a block diagram of the spread spectrum receiver according to the invention.

FIG. 3 is a block diagram illustrating one embodiment of the receiver according to the invention. This receiver structure is designed to operate in situations where the message and reference signals occupy a contiguous band of frequencies; i.e., they overlap in frequency or occupy adjacent frequency bands. The signal received at an antenna 20 is first passed through a bandpass filter 21 which rejects frequencies outside the bandwidth of the composite message and reference signal. After some amplification in an automatic gain control (AGC) amnplifier 22, the composite signal is passed though a nonlinear device 23, such as a squarer or full wave rectifier, which produces a term that is proportional to the square of the signal. The output signal of this device will be comprised of several components, one of which is the original FSK signal on a carrier of frequency $f_2-f_1$. This signal is supplied to a conventional FM demodulator 24, including a bandpass filter 241 and a limiter/discriminator 242. Alternatively, the FM demodulator cain be implemented with a phase-locked loop demodulator. The demodulator output signal is then supplied to a detector (or threshold device) and at data bit timing recovery system 25.

The receiver can be manufactured at low cost due to its simplicity and the fact that it makes extensive use of components that are made for existing commercial products. Low cost, low power FM demodulator chips and low cost, highly selective ceramic and crystal bandpass filters for standard IF frequencies are readily available. The nonlinear device, such as a squarer or full wave rectifier, can be implemented using a standard double-balanced mixer of simple circuit construction using a few diodes and a transformer. It is important to note that the receiver does not require any high frequency reference oscillators which can add significantly to the cost and power consumption of a receiver.

Two of the most important aspects of the system are its performance in multipath and interference. In multipath, more than one copy of the transmit signal will be received, with each copy having a different time delay and phase shift. The sumning of these multiple paths at the receiver can result in cancellation of all or part of the signal. One of the features of a spread spectrum signal is that it is relatively insensitive to versions of the signal that are delayed by more than one chip interval from the primary signal (usually the signal that follows the line-of-sight (LOS) path); i.e., when the "delay spread" is greater than one chip interval. When the delay spread is less than one chip interval, the multipath is not "resolvable" by the spread spectrum system and can result in severe performance loss. As a result, one generally uses a chip rate that is as high as possible, i.e., as high as the available bandwidth and system hardware allows, in order to minimize the range of delay values which produce unresolvable multipath.

When resolvable multipath is present, the receiver shown in FIG. 3 actually demodulates all the signals and sums them to improve performance. The reason for this is that each signal path produces a message signal and reference signal with the same delay and, as a consequence, the receiver can operate to demodulate each of the paths. The only limitation on this feature is that the delay between the signals of any two signal paths must not produce destructive interference between the signals at frequency $f_1-f_2$, meaning that frequency $f_1-f_2$ must be low enough such that any delay less than the maximum expected delay spread does not result in a 180° phase shift. For instance, if $f_1-f_2$=100 KHz, two equal strength paths will completely cancel each other when the delay spread is 0.5(1/100 kHz)=5 $\mu$s. For $f_1-f_2$ greater than 100 kHz, complete cancellation will occur at a smaller value of the delay spread while for $f_1-f_2$ less than 100 kHz, complete cancellation can only occur for a larger value of delay spread. Consequently, $f_1-f_2$ is a design parameter that must be chosen to accommodate the expected channel delay spread characteristics.

Another concern is that the data rate must be sufficiently low so that the delayed paths do not produce significant intersymbol interference (ISI). This is a separate effect from the cancellation that can occur by having $f_1-f_2$ too small. The result of ISI is that the data bits themselves overlap at the receiver, making it difficult to make correct decisions. Generally, acceptable performance can be obtained by keeping the data rate sufficiently low so that the delay spread is less than approximately ⅛ of a symbol duration.

Figure 4:
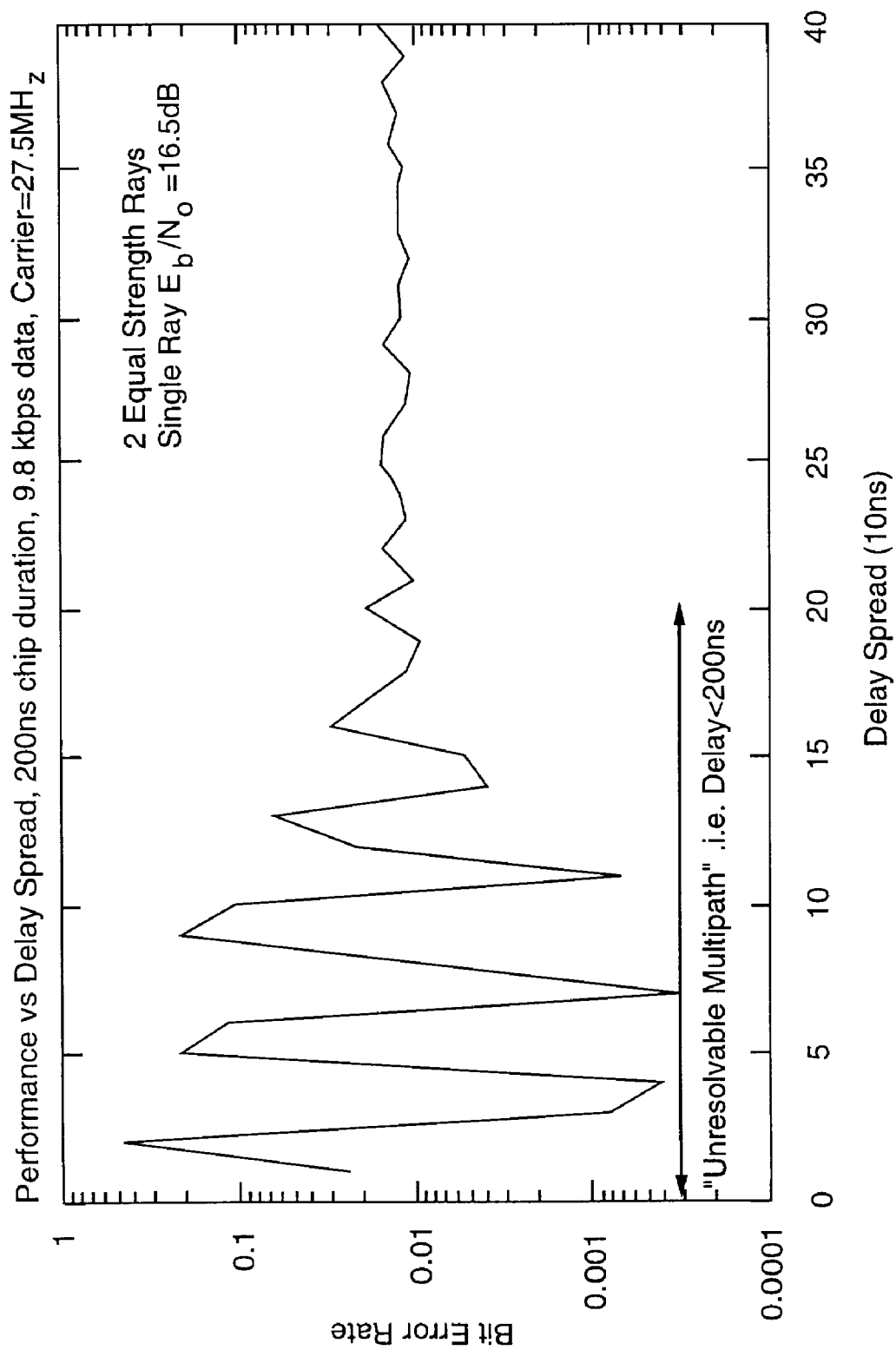
FIG. 4 is a graph showing bit error rate (BER) versus delay spread for two equal strength signal paths.

FIG. 4 shows the performance of the system, obtained through computer simulation, when the carrier frequency of the message signal is 27.5 MHZ, the carrier of the reference signal is 27.6 MHZ (i.e., $f_1-f_2$=100 kHz), the chip rate is 4 MHZ and the data rate is 9.8 kbps. FIG. 4 plots bit error rate (BER) in additive white Gaussian noise (AWGN) versus the delay spread and considers the case where there are two equal strength paths (which are often called "rays") and the single path energy per bit to white noise spectral density ratio ($E_b/N_o$) is 16.5 dB. In the region where the delay spread is less than the chip duration (i.e., <200 ns), the multipath cannot be resolved and the BER varies widely as the two carriers are adding either constructively or destructively, depending on the relative carrier phases. The period of the variations with delay spread equals the period of the carrier frequency, 1/27.5 MHZ=36.36 ns. For a higher carrier frequency, the period of the oscillations shown in the figure would be smaller. For delay spread values greater than 200 ns, system performance is relatively flat, illustrating the insensitivity to multiple paths provided by this system.

Figure 5:
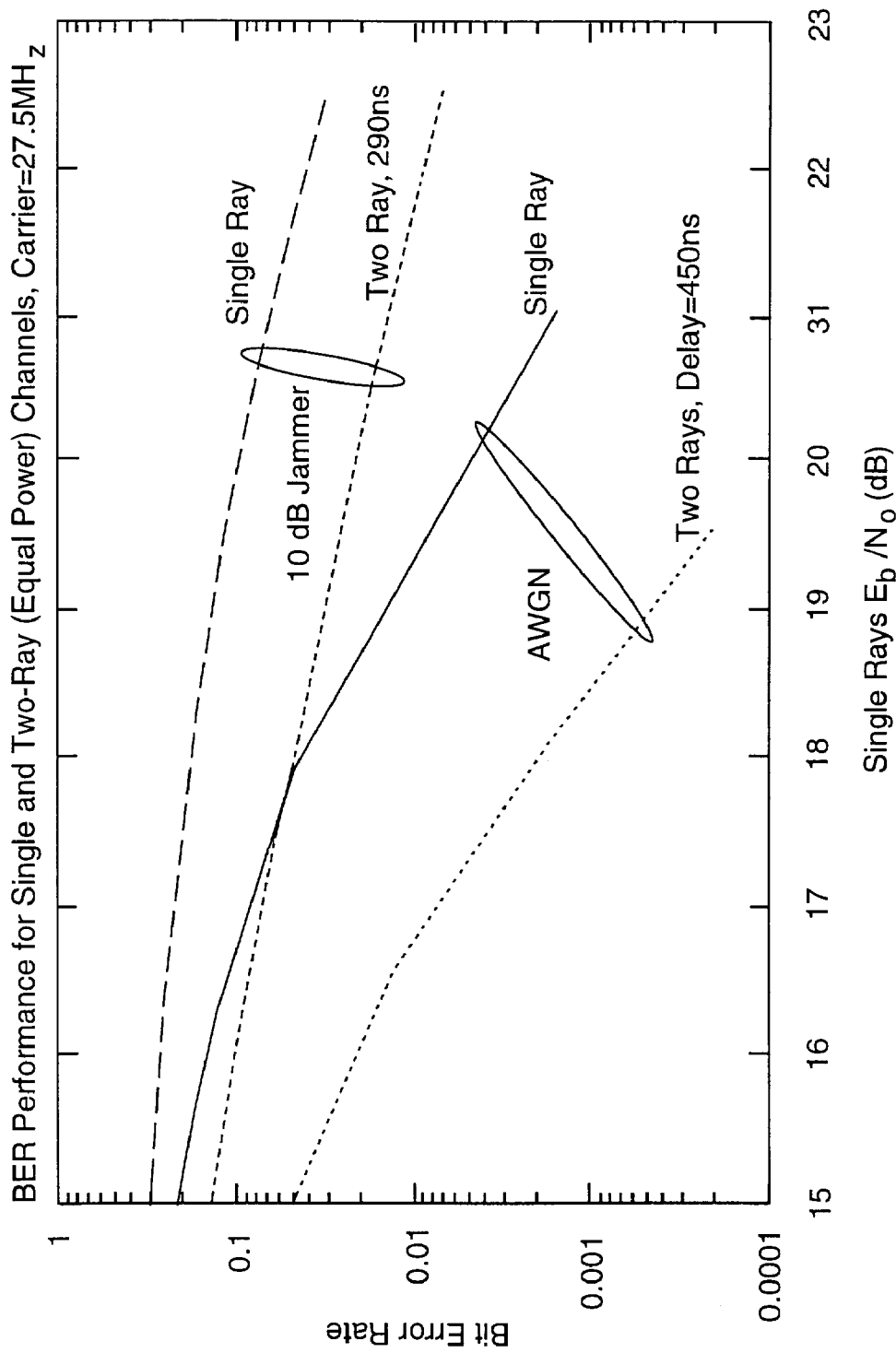
FIG. 5 is a graph showing BER performance versus white noise spectral density ratio.

FIG. 5 shows the BER performance as a function of the single path $E_b/N_o$ for the cases where there are one or two (equal strength) paths. Included is the performance when a single tone jammer having 10 times the power of the single path signal is added. The performance improvement that occurs when a second path is added illustrates the property that the receiver combines energy from the paths. The delay values used, 290 ns when the jammer is present and 450 ns in AWGN alone, are sufficiently large to make the multipath resolvable by the spread spectrum system. While the performance is degraded significantly when this strong jammer is added, acceptable BER values are still attainable by increasing $E_b/N_o$.

There are several possible variations to the basic technique disclosed. For example, the system can be used for analog signals such as voice. The analog waveform is simply fed to FM modulator 11 in the transmitter (FIG. 1) and the recovered waveform is obtained from FM demodulator 24 in the receiver (FIG. 3). The overall system retains its ability to tolerate multipath and interference.

The FM/FSK modulation/demodulation can be replaced with some other type of digital modulation. An example would be to use differential phase-shift keying (DPSK) and differentially coherent demodulation. Some performance improvement may be available by using coherent demodulation (e.g., coherent PSK) at the expense of making the receiver more complex.

Figure 6:
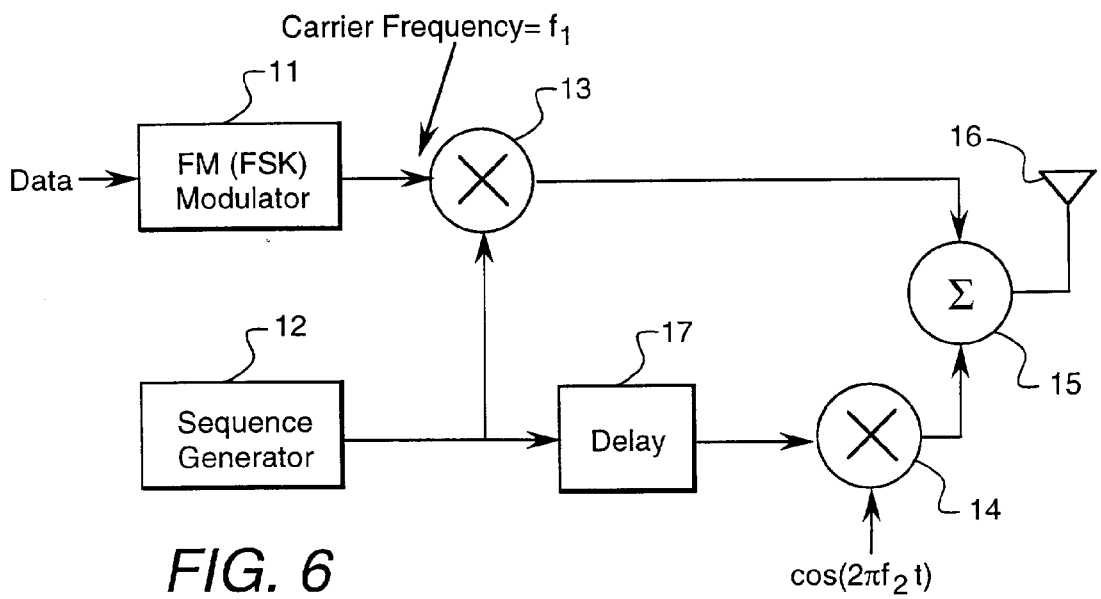
FIG. 6 is a block diagranm of a direct sequence spread spectrum transmitter with a delay for delaying the output signal of the sequence generator.
Figure 7:
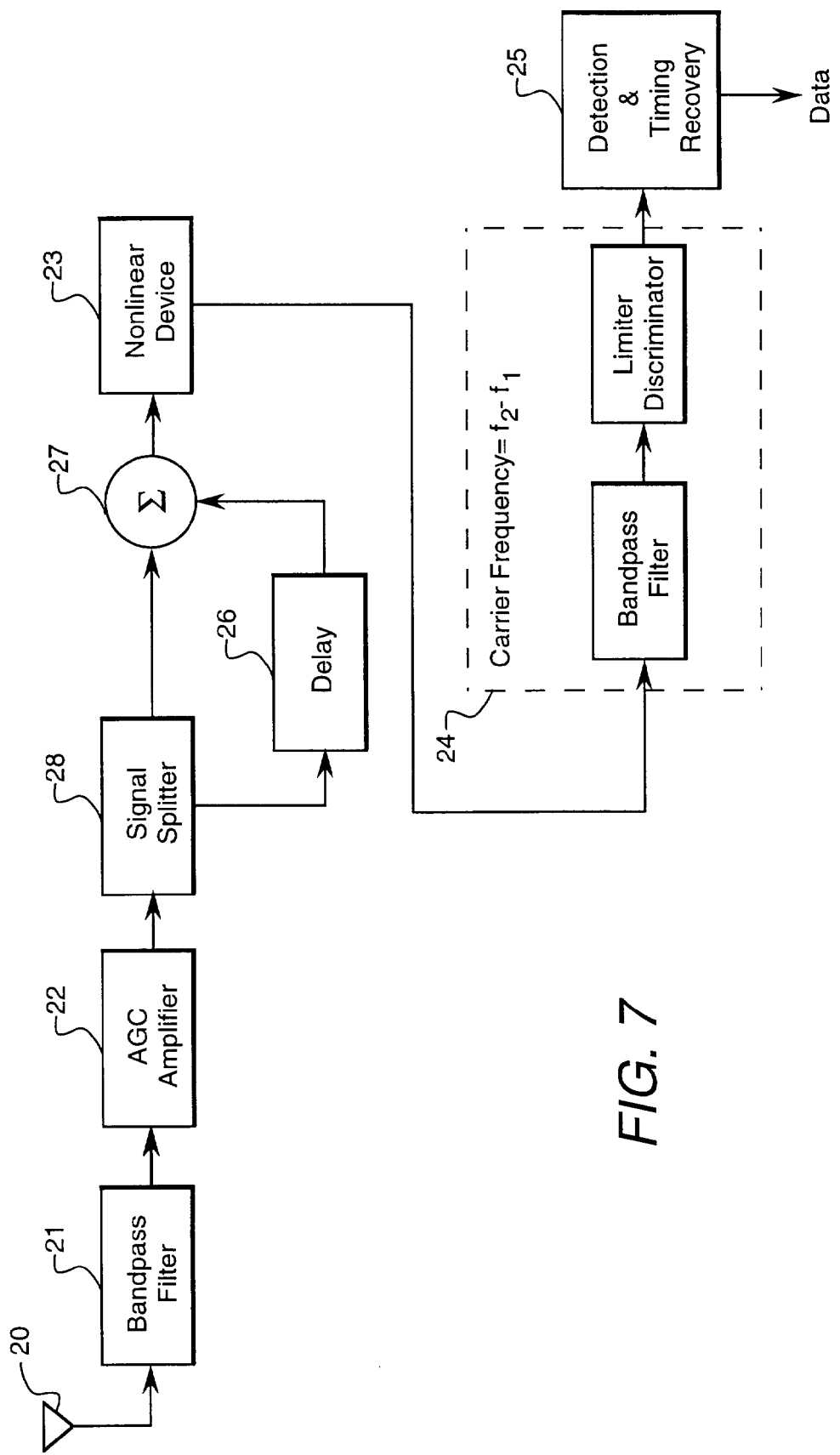
FIG. 7 is a block diagram of the spread spectrum receiver for receiving signals from the tranfsmitter of FIG. 6.

As shown in the transmitter of FIG. 6, a delay 17 may be inserted between the message signal and the reference signal to make it possible to send multiple messages from multiple transmitters using the same value of $f_1-f_2$. In this case, the receiver structure has to be altered, as shown in FIG. 7, by splitting the signal in a signal splitter 28 ahead of non-linear device 23, delaying one path by the proper amount with a delay element 26, summing the delayed and undelayed signals in a summer 27, and feeding the sum to non-linear device 23. Although this makes the receiver more complex, it creates an additional way of multiplexing several signals into the transmission channel.

It is also possible to use spreading waveforms which, unlike the pseudorandom sequence generated in sequence generator 12 (FIG. 1), are non-binary valued, such is Gaussian noise, Geometric Harmonic Modulation (GHM) waveforms, or other wideband waveforms.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A spread spectrum communication system comprising:
   a transmitter including
      a modulator for modulating an information input signal with a carrier frequency $f_1$,
      a spreading signal generator,
      a first mixer for combining the modulated carrier signal with a spreading signal from said spreading signal generator,
      a second mixer for combining the spreading signal from said spreading signal generator with a second frequency $f_2$ different from said carrier frequency $f_1$, the difference frequency $f_1-f_2$ being sufficiently low that any delay less than a maximum expected delay spread does not result in a 180° phase shift, and
      a summer for adding output signals of said first and second mixers to produce a transmitted signal; and
   a receiver including
      radio frequency receiver means for receiving said transmitted signal from said transmitter,
      a nonlinear device for squaring an input signal supplied thereto,
      circuit means coupling said nonlinear device to said radio frequency receiver means, and
      a demodulator for demodulating the squared output signal at a carrier frequency of $f_2-f_1$.

2. The spread spectrum communication system of claim 1 wherein said information signal is binary data, said modulator in said transmitter comprises a frequency modulator, and said spreading signal generator comprises a pseudorandom sequence generator.

3. The spread spectrum communication system of claim 1 wherein said receiver further includes detection and timing recovery means for recovering said information signal from the demodulated signal.

4. The spread spectrum communication system of claim 1 wherein said transmitter further includes a delay element coupled between said spreading signal generator and said second mixer.

5. The spread spectrum communication system of claim 4 wherein said circuit means comprises:
   a signal splitter for splitting an output signal from the radio frequency receiver means into first and second signal paths;
   a delay element situated in said second signal path; and
   a summer for adding a signal in said first signal path with an output signal of the second signal path, said summer providing the input signal supplied to said nonlinear device.

6. The spread spectrum communication system of claim 1 wherein said information signal is an analog signal and said modulator in said transmitter comprises a frequency modulator.

7. A spread spectrum transmitter comprising:
   a modulator for modulating an information input signal with a carrier frequency $f_1$;
   a spreading signal generator;
   a first mixer for combining the modulated carrier signal with a spreading signal from said spreading signal generator;
   a second mixer for combining the spreading signal from said spreading signal generator with a second frequency $f_2$ different from said carrier frequency $f_1$, the difference frequency $f_1-f_2$ being sufficiently low that any delay less than a maximum expected delay spread does not result in a 180° phase shift; and
   a summer for adding output signals of said first and second mixers to produce a transmitted signal.

8. The spread spectrum transmitter of claim 7 further comprising a delay element coupled between said spreading signal generator and said second mixer.

* * * * *